(12) United States Patent
Swidler et al.

(10) Patent No.: US 7,747,635 B1
(45) Date of Patent: Jun. 29, 2010

(54) AUTOMATICALLY GENERATING EFFICIENT STRING MATCHING CODE

(75) Inventors: Shlomo Swidler, Bareqet (IL); Daniel Blaukopf, Ra'anana (IL)

(73) Assignee: Oracle America, Inc., Redwood City, CA (US)

( * ) Notice: Subject to any disclaimer, the term of this patent is extended or adjusted under 35 U.S.C. 154(b) by 585 days.

(21) Appl. No.: 11/019,014

(22) Filed: Dec. 21, 2004

(51) Int. Cl.
G06F 7/00 (2006.01)
G06F 17/30 (2006.01)

(52) U.S. Cl. ...................................... 707/758
(58) Field of Classification Search ........................ None
See application file for complete search history.

(56) References Cited

U.S. PATENT DOCUMENTS

| | | | |
|---|---|---|---|
| 5,990,810 A | 11/1999 | Williams | |
| 6,075,896 A | 6/2000 | Tanaka | |
| 6,611,213 B1 | 8/2003 | Bentley | |
| 6,785,677 B1 * | 8/2004 | Fritchman | 707/6 |
| 7,444,326 B1 * | 10/2008 | Jagadish et al. | 707/3 |
| 2003/0028522 A1 * | 2/2003 | Collins-Thompson et al. | 707/3 |
| 2003/0069941 A1 * | 4/2003 | Peiffer | 709/217 |
| 2003/0078915 A1 * | 4/2003 | Chaudhuri et al. | 707/3 |
| 2004/0210551 A1 * | 10/2004 | Jones et al. | 707/1 |
| 2005/0198026 A1 * | 9/2005 | Dehlinger et al. | 707/5 |
| 2006/0004744 A1 * | 1/2006 | Nevidomski et al. | 707/4 |
| 2006/0179052 A1 * | 8/2006 | Pauws et al. | 707/6 |

* cited by examiner

*Primary Examiner*—Neveen Abel Jalil
*Assistant Examiner*—Raheem Hoffler
(74) *Attorney, Agent, or Firm*—Meyertons, Hood, Kivlin, Kowert & Goetzel, P.C.

(57) ABSTRACT

A tool is provided, which generates source code for matching a predetermined set of strings against a client-supplied string at runtime. The tool employs an efficient matching technique in which maximal use is made of the length of the client-supplied string, and the number of comparison operations is minimized. Using the tool, a string equality operation may be deferred until a high likelihood of success is indicated, or omitted entirely.

12 Claims, 3 Drawing Sheets

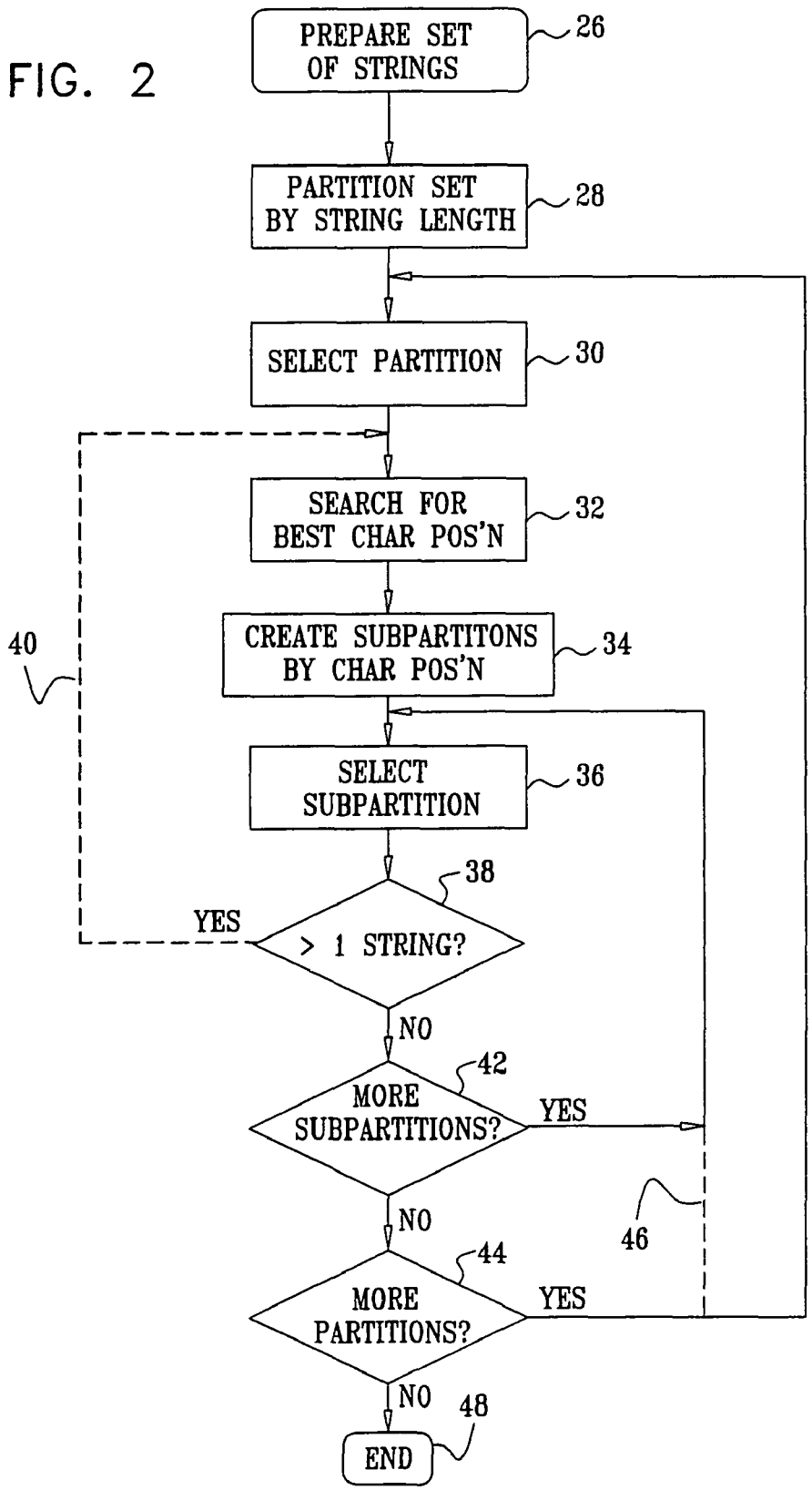

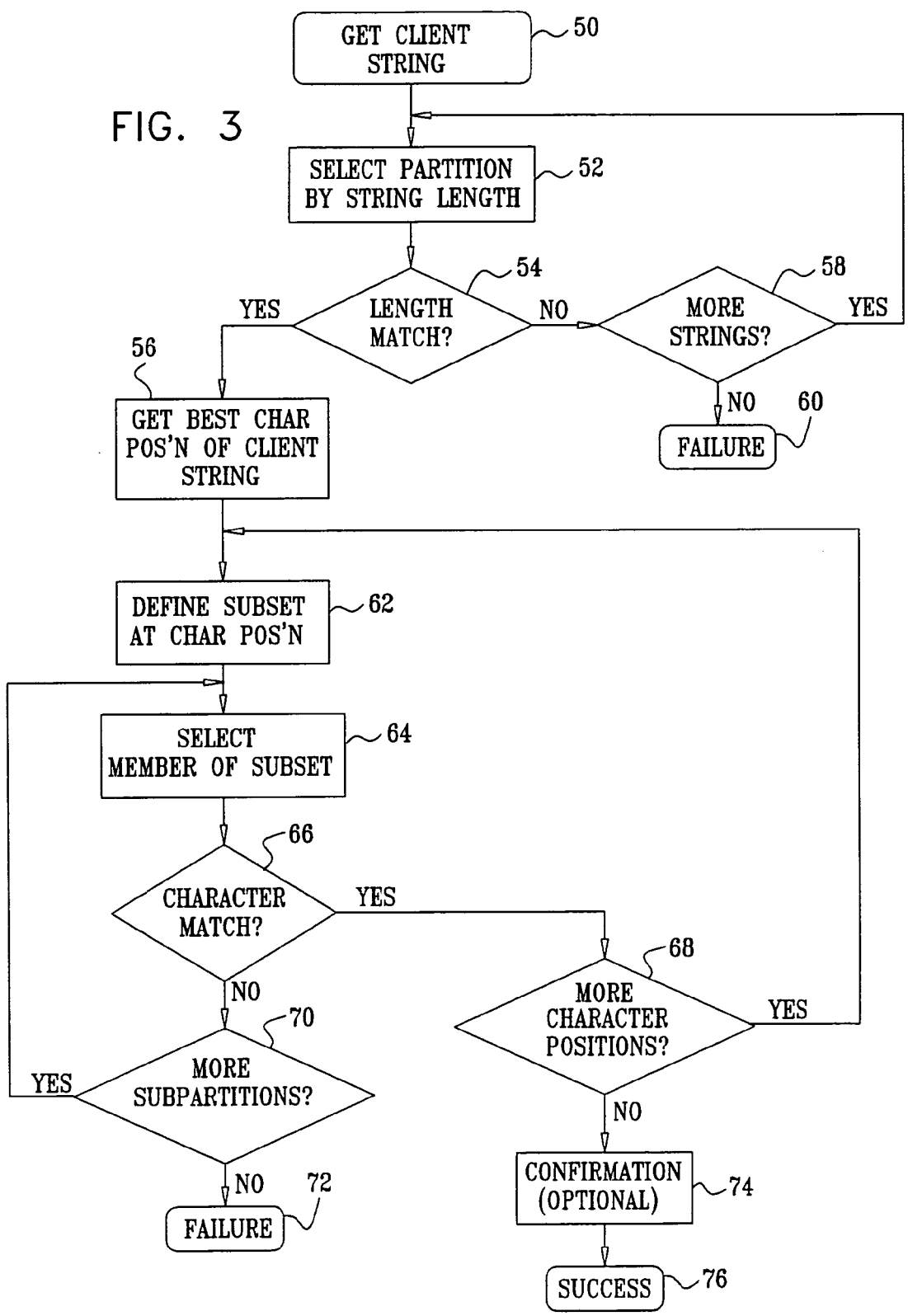

AUTOMATICALLY GENERATING EFFICIENT STRING MATCHING CODE

COPYRIGHT AND TRADEMARK NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The terms Sun, Sun Microsystems, Java, J2ME, and the Sun logo are trademarks or registered trademarks of Sun Microsystems, Inc., in the United States of America and other countries. All other company and product names may be trademarks of their respective companies.

REFERENCE TO COMPUTER PROGRAM LISTING APPENDIX

Computer program listing appendices are submitted herewith on one compact disc and one duplicate compact disc. The total number of compact discs including duplicates is two. The files on the compact disc are ASCII text files in which the characters are displayed as their corresponding values in hexadecimal format. Their names, dates of creation, directory locations, and sizes in bytes are:

Directory appendix containing file 50992.hex of Oct. 13, 2004 and of length 103,663 bytes.

The file contains three computer program listings, which are referred to herein as Listings 1-3. The material on the compact discs is incorporated herein by reference.

BACKGROUND OF THE INVENTION

1. Field of the Invention

This invention relates to user interfaces for computer systems. More particularly, this invention relates to matching a client-supplied string to requirements of a software component of a computer system.

2. Description of the Related Art

In user interfaces for computer systems, software components often contain predefined text strings that can be selected by clients. For example, a calendar interface may provide several predefined strings that can be used to specify month names. Clients provide one of these predefined strings when calling the relevant methods of the calendar object. Internally, the calendar implementation must determine which, if any, of the predefined strings is matched by the client-supplied string.

Conventionally, the algorithm for matching the client-supplied string is often coded as shown in the following pseudocode fragment:

if ClientString equals "JANUARY" then use month-Num=1
else if ClientString equals "FEBRUARY" then use month-Num=2
else if ClientString equals "MARCH" then use month-Num=3
else if ClientString equals "APRIL" then use month-Num=4

This is not an efficient implementation for a number of reasons: The operation of comparing two strings for equality is computationally expensive. It may involve a call to the underlying operating system to compare the memory ranges of the two strings for equality. Calls to the underlying operating system typically involve a context switch, which is an expensive operation. Furthermore, matching strings by performing a complete content comparison as described above ignores other, more readily available information.

One approach to matching strings more efficiently involves pre-placement of candidate strings into a hash table at runtime, before the desired lookup is performed. A lookup of a client-supplied string in the hash table according to its hash value is then performed. This approach incurs a runtime performance cost to initialize the hashtable and a memory cost to store the hashtable.

Lexical analyzers, such as the program lex in the Unix environment have long been available for matching strings. Lex matches the characters of strings sequentially. Sequential matching cannot be implemented efficiently in all programming environments. For example, in some versions of Java 2 Micro Edition (J2ME), access to individual characters of a string requires one method call per character, which is inefficient. A need remains for a more efficient technique for rejecting invalid data during string matching.

SUMMARY OF THE INVENTION

According to a disclosed embodiment of the invention, a tool is provided, which generates source code for matching a client-supplied string that is supplied at runtime against a set of candidate strings. The tool employs an improved, efficient matching technique, based on the following three principles:

(1) Maximal use is made of the length of the client-supplied string.

(2) A minimum number of individual characters are compared.

(3) A string equality operation, which is relatively expensive, is deferred until a high likelihood of success is indicated by earlier operations.

The client provides a configuration that identifies a set of possible strings. Based on the configuration, the tool automatically generates code to identify a matching string among the possibilities, utilizing an algorithm that is maximally efficient at runtime, without impacting startup time or memory usage.

According to disclosed embodiments of the invention, the process of writing and modifying efficient code to identify which of a given set of candidates matches a string in question is automated. Previously this needed to be done by hand, after analyzing the set of possible strings.

The invention provides a computer-implemented method of string matching, which is carried out by establishing partitions of a predetermined set of first strings, wherein each of the partitions includes a subset of the first strings, each member of the subset having a common string length. The method is further carried out by establishing subpartitions of the partitions according to character positions of the first strings thereof, such that each of the subpartitions contains exactly one of the first strings, matching a length of a second string with the common string length of one of the partitions, and identifying the second string with one of the first strings by matching characters of the first strings of the subpartitions of the one partition with like-positioned characters of the second string.

In one aspect of the method, the step of establishing subpartitions is performed recursively.

According to a further aspect of the method, a first iteration of the step of establishing subpartitions is performed by identifying a best character position, as defined below, of the subset of the set of first strings in each of the partitions, and establishing the subpartitions at the best character position, respectively.

According to another aspect of the method, identifying the best character position includes determining a number of subpartitions of the subset at each character index position thereof.

In still another aspect of the method, matching the characters of the first strings is initially performed at a best character position of the set of first strings.

The invention provides a computer software product, including a computer-readable medium in which computer program instructions are stored, which instructions, when read by a computer, cause the computer to perform a method for string matching, which is carried out by establishing partitions of a predetermined set of first strings, wherein each of the partitions includes a subset of the first strings, each member of the subset having a common string length. The method is further carried out by establishing subpartitions of the partitions according to character positions of the first strings thereof, such that each of the subpartitions contains exactly one of the first strings, matching a length of a second string with the common string length of one of the partitions, and identifying the second string with one of the first strings by matching characters of the first strings of the subpartitions of the one partition with like-positioned characters of the second string.

The invention provides a data processing system, including a computer in which computer program instructions are stored, which instructions, when read by the computer, cause the computer to perform a method for string matching, which is carried out by establishing partitions of a predetermined set of first strings, wherein each of the partitions includes a subset of the first strings, each member of the subset having a common string length. The method is further carried out by establishing subpartitions of the partitions according to character positions of the first strings thereof, such that each of the subpartitions contains exactly one of the first strings, matching a length of a second string with the common string length of one of the partitions, and identifying the second string with one of the first strings by matching characters of the first strings of the subpartitions of the one partition with like-positioned characters of the second string.

The invention provides a computer-implemented method of string matching, which is carried out by automatically generating computer-readable instructions, which when read by a computer, cause the computer to perform the steps of establishing partitions of a predetermined set of first strings, wherein each of the partitions includes a subset of the first strings. The first strings in each subset have a common string length. The computer is further instructed to establish subpartitions of the partitions according to character positions of the first strings thereof, such that each of the subpartitions contains exactly one of the first strings, The computer is further instructed to include the computer-readable instructions in a computer program, execute the computer program, and during runtime of the computer program, accepting a second string during runtime of the computer program, matching a length of the second string with the common string length of one of the partitions, and matching characters of the first strings of the subpartitions of the one partition with like-positioned characters of the second string to identify one of the first strings with the second string.

The invention provides a computer software product, including a computer-readable medium in which first instructions are stored, which first instructions, when read by a computer, cause the computer to perform a method for string matching, which is carried out by automatically generating second computer-readable instructions, which when read by a computer, cause the computer to perform the steps of establishing partitions of a predetermined set of first strings, wherein each of the partitions includes a subset of the first strings. The first strings in each subset have a common string length. The computer is further instructed to establish subpartitions of the partitions according to character positions of the first strings thereof, such that each of the subpartitions contains exactly one of the first strings, The computer is further instructed to include the second computer-readable instructions in a computer program, execute the computer program, and during runtime of the computer program, accepting a second string during runtime of the computer program, matching a length of the second string with the common string length of one of the partitions, and matching characters of the first strings of the subpartitions of the one partition with like-positioned characters of the second string to identify one of the first strings with the second string.

The invention provides a data processing system including a computer in which first computer program instructions are stored, which first instructions, when read by the computer, cause the computer to perform a method for string matching, which is carried out by automatically generating second computer-readable instructions, which when read by a computer, cause the computer to perform the steps of establishing partitions of a predetermined set of first strings, wherein each of the partitions includes a subset of the first strings. The first strings in each subset have a common string length. The computer is further instructed to establish subpartitions of the partitions according to character positions of the first strings thereof, such that each of the subpartitions contains exactly one of the first strings, The computer is further instructed to include the second computer-readable instructions in a computer program, execute the computer program, and during runtime of the computer program, accepting a second string during runtime of the computer program, matching a length of the second string with the common string length of one of the partitions, and matching characters of the first strings of the subpartitions of the one partition with like-positioned characters of the second string to identify one of the first strings with the second string.

The invention provides a computer-implemented method of string matching, which is carried out by receiving a set of reference strings, separating the set, using a computer under control of program instructions, into partitions according to the lengths of the reference strings. The method is further carried out using the computer under control of the program instructions, to determine a sorting criterion within each of the partitions according to a position of one of the characters in each of the reference strings in each of the partitions, and to generate computer software code for identifying an input string with one of the reference strings according to the partitions and to the sorting criterion within each of the partitions.

One aspect of the method includes forming subpartitions of each of the partitions using the sorting criterion, wherein the computer software code includes code for identifying the input string with one of the reference strings in one of the subpartitions.

According to another aspect of the computer-implemented method, each of the subpartitions contains exactly one of the reference strings.

The invention provides a computer software product, including a computer-readable medium in which computer program instructions are stored, which instructions, when read by a computer, cause the computer to perform a method of string matching, which is carried out by receiving a set of reference strings, separating the set, using a computer under control of program instructions, into partitions according to the lengths of the reference strings. The method is further carried out using the computer under control of the program instructions, to determine a sorting criterion within each of the partitions according to a position of one of the characters in each of the reference strings in each of the partitions, and to generate computer software code for identifying an input string with one of the reference strings according to the partitions and to the sorting criterion within each of the partitions.

The invention provides a data processing system including a computer in which computer program instructions are stored, which instructions, cause the computer to perform a method of string matching, which is carried out by receiving a set of reference strings, separating the set, using a computer under control of program instructions, into partitions according to the lengths of the reference strings. The method is further carried out using the computer under control of the program instructions, to determine a sorting criterion within each of the partitions according to a position of one of the characters in each of the reference strings in each of the partitions, and to generate computer software code for identifying an input string with one of the reference strings according to the partitions and to the sorting criterion within each of the partitions.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 2 is a flow chart illustrating a first phase of a method of runtime string matching in accordance with a disclosed embodiment of the invention; and FIG. 3 is a flow chart illustrating a second phase of a method of runtime string matching in accordance with a disclosed embodiment of the invention.

DETAILED DESCRIPTION OF THE INVENTION

Figure 1:
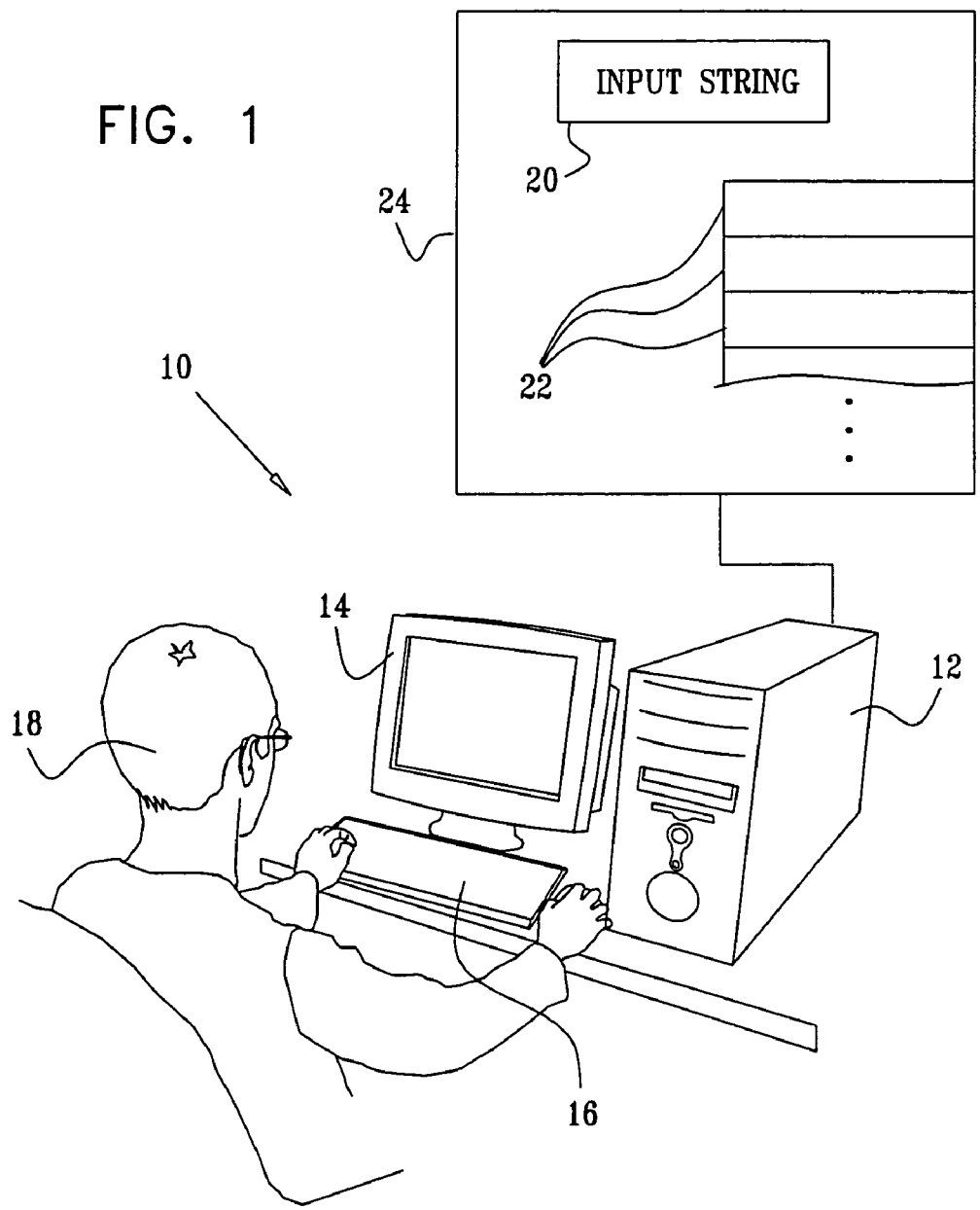
FIG. 1 is a block diagram of a data processing system in which the principles of the invention can be applied.

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Overview.

Turning now to the drawings, reference is initially made to FIG. 1, which is a block diagram of a system 10 in which the principles of the invention can be applied. The system 10 can be any type of computer system. It includes a computing device 12, such as a personal computer or workstation. The system 10 can be a standalone system, or may be a component of a networked environment. In any case, client input is permitted in order to modify the operation of programs that are executing in the system. Typically, a client interface to the system 10 is realized by a monitor 14 and an input device, which is typically a keyboard 16 for use by an operator 18.

In one mode of client interaction with the system 10 that is relevant to the instant invention, during execution of a program on the computing device 12, it is necessary to match an input string 20 produced by the operator 18 on the keyboard 16 with a predetermined set of strings 22. Both the client input and the set of possibilities are represented as strings of characters. According to a disclosed embodiment of the invention, an improved, efficient technique is provided for runtime string matching, based on the following three principles:

(1) Maximal use is made of the length of the client-supplied string.

(2) A minimum number of individual characters are compared.

(3) A string equality operation, which is relatively expensive, is deferred until a high likelihood of success is indicated by earlier operations.

It is possible to write a program that implements a mapping between a predetermined set of strings and client-supplied strings, while obeying these three principles, but it is difficult to do. The difficulty is compounded as the number and length of possible strings increases, and when their "similarity" increases. It is especially difficult to modify existing code that implements string matching, when a new string is added to the set of possibilities.

Matching strings solely based on their contents ignores other, more readily available information. Often the length of a string is readily available to the program. Consider a case of a calendric operation, where one seeks to match the client-supplied string "MAY". Simply knowing that a string of length 3 is being considered eliminates the need to make comparisons with longer possibilities, e.g., the strings "JULY", "APRIL", because these must fail. Even when the length of a string is not readily known and must be specifically computed, the expense of this computation can be justified by the savings it may yield in avoiding full string comparisons with disqualified possibilities.

Often, it is cheaper to compare individual characters within the two strings rather than comparing the entire strings. For example, in a case of the client-supplied string "DECEMBER", the first character 'D' of the string may be evaluated. Comparisons with possibilities that do not possess a first character 'D' can be avoided, because they are guaranteed not to match the client-supplied string.

Method of Operation.

Continuing to refer to FIG. 1, a software tool 24 is provided, which identifies an efficient algorithm with which to search the set of strings 22 for a match with the input string 20, based on the lengths and the characters at different positions of the members of the set of strings 22. After analyzing the set of possible strings to determine the best algorithm, the tool generates source code that implements this algorithm. An example is given in Listing 3.

Reference is now made to FIG. 2, which is a flow chart illustrating a first phase of a method of runtime string matching in accordance with a disclosed embodiment of the invention. The process steps are shown in a particular sequence in FIG. 2 for clarity of presentation. However, it will be evident that some of them can be performed in parallel, asynchronously, or in different orders. Furthermore, those skilled in the art will appreciate that certain sequences shown in FIG. 2 can conveniently by implemented using recursion. Alternatively, non-recursive techniques may be employed for greater computational efficiency.

At initial step 26, a predetermined set of possible strings to be matched to a client input string is prepared and configured in a computer application by known methods. For example, the set could be memorized in a drop-down listbox or similar control. Alternatively, the set could be established as a simple array of strings.

Next, step 28 introduces a sequence in which the set of strings that was produced in initial step 26 is analyzed recursively. First, partitions of the set of strings are created, based on their lengths.

Operations on the partitions created in step 28 now commence, which results in a repartitioning of the set of strings that was established in initial step 26, wherein each final partition contains only a single member of the set. The following steps can be implemented recursively.

At step 30 a partition is selected from the partitions by length that were created in step 28.

Next, at step 32, the subset of strings in the partition that was selected at step 30 are searched to determine the character position (i.e., character index position or character index) within them that would further partition the strings into the most number of subpartitions. This character position is recorded, and is referred to herein as a "best-character position". It may be different for different partitions of the set of strings. This position is determined for each partition by iteratively computing the number of subpartitions of the subset at each character index position, and selecting the character index corresponding to the largest number of subpartitions as the best character position.

Next, at step 34 subpartitions of the partition that was analyzed in step 32 are created according to the character position that was determined.

Next, at step 36, one of the subpartitions created at step 34 is selected.

Next, at decision step 38, a determination is made whether the current subpartition that was selected in step 36 contains more than one string.

If the determination at decision step 38 is affirmative, then it is necessary to repeat the sequence beginning at step 32, in which the current subpartition is searched and re-divided. Control returns to step 32. Recursion may be employed for convenience of implementation, as shown by a broken line 40.

If the determination at decision step 38 is negative, then control proceeds to decision step 42. Here it is determined whether more subpartitions need to be evaluated.

If the determination at decision step 42 is affirmative, then control returns to step 36.

If the determination at decision step 42 is negative, then every subpartition at the current level of recursion contains exactly one string. It is now necessary to determine whether other levels of recursion remain to be evaluated. A return from recursion now occurs if appropriate.

Control now proceeds to decision step 44, where it is determined if more of the partitions that were created in step 28 remain to be processed. If the determination at decision step 44 is affirmative, then control returns to step 30. In the event recursion was performed, then control may return to step 36 as a return from a deeper level of recursion in order to complete the processing of subpartitions at the next higher level, as indicated by the broken line 46.

If the determination at decision step 44 is negative, then control proceeds to final step 48, completing the first phase. At this point, every partition contains exactly one string.

Reference is now made to FIG. 3, which is a flow chart illustrating a second phase of a method of runtime string matching in accordance with a disclosed embodiment of the invention. In the second phase, data structures, typically strings, that hold the partitions that were generated according to the method disclosed in FIG. 2 are checked for correspondence with a client-supplied string.

The method begins at initial step 50, in which a string to be matched is provided by a client.

Next, at step 52 a data structure containing one of the partitions created in step 28 (FIG. 2) is selected. It will be recalled that the partitioning in step 28 was according to string length.

Control now proceeds to decision step 54, where it is determined if the length of the client-supplied string obtained in initial step 50 is the same as the length of the string associated with the partition selected in step 52. If the determination at decision step 54 is affirmative, then control proceeds directly to step 56, which is described below.

If the determination at decision step 54 is negative, then control proceeds to decision step 58, where it is determined if more data structures associated with the partitions created in step 28 (FIG. 2) remain to be processed. If the determination at decision step 58 is affirmative, then control returns to step 52.

If the determination at decision step 58 is negative, then the client-supplied string does not match any of the possibilities. Control proceeds to final step 60, and the method ends in failure.

Step 56 is performed when a match by string length is found between the client-supplied string and a string in one of the partitions. The best character position of the client-supplied string is initially selected. This position was established in step 32 (FIG. 2) as the character position that would allow the candidate strings in the current partition to be divided into the largest number of subpartitions.

Next, at step 62 operations are performed on a partition and its subpartitions, all being associated with a string having the same length as the client-supplied string. Members of this subset were created in various performances of step 34 (FIG. 2). This subset is now defined. When step 62 is performed for the first time, the subset consists of the subpartitions that were created at the best character position of the client-supplied string that was established in step 56. In subsequent iterations of step 62, the subset is constituted from subpartitions that share other character positions, while still having the length of the client-supplied string. In any case, one member of the subset is selected at step 64.

Control now proceeds to decision step 66, where it is determined if the character at the best-character position in the client-supplied string matches the like-positioned character in the string associated with the current member of the subset that was selected at step 64.

If the determination at decision step 66 is affirmative, then control proceeds to decision step 68, which is described below.

If the determination at decision step 66 is negative, then control proceeds to decision step 70, where it is determined if there are more members of the current subset that was defined in step 64 remaining to be processed.

If the determination at decision step 70 is affirmative, then control returns to step 64.

If the determination at decision step 70 is negative, then there are no matches between the set of possibilities and the client-supplied string. Control proceeds to final step 72, and the procedure ends in failure.

Decision step 68 is performed if a character match was found at decision step 66. Here it is determined if there are more character positions in the client-supplied string to evaluate.

If the determination at decision step 68 is affirmative, then control returns to step 62.

If the determination at decision step 68 is negative, then control proceeds to an optional step 74. It has now been determined that there is a complete match between the client-supplied string and the set of possibilities. Indeed, there is only one such match among the set of possible strings. Confirmation of the match may be obtained using a conventional string comparison between the client-supplied string and the string that is associated with the last performance of decision step 66.

Next, at final step 76, it is concluded that the client-supplied string matches the string associated with the subset member in the last performance of decision step 66. The procedure terminates successfully.

Performance Analysis.

In the worst case, the method described with reference to FIG. 2 requires one more character comparison operation than a sequential algorithm, such as is used in programs such as lex. More typically, however, the inventive method results in significantly fewer comparison operations as compared to a sequential algorithm.

Automated Code Development.

Listing 1 is a Java code listing that accepts as input a set of strings to be matched, and performs the steps as detailed in FIG. 2 and FIG. 3. Java is available from Sun Microsystems, Inc., Palo Alto, Calif. The output is source code that can be compiled into an executable program that accepts a client-supplied string to be matched with the set of strings. Although Listing 1 is provided as Java source code, the invention is by no means restricted to the use of Java. It will be clear to those skilled in the art that the principles of the invention can be applied using other computer languages and development environments.

The program of Listing 1 maps a reference set of strings to integers in a near-optimal manner. This program is an implementation of the methods described above with respect to FIG. 2 and FIG. 3.

A developer includes the source code or executable code in a computer application using known techniques of compilation and linking or using any suitable application development environment. While the computer application is executing, a client inputs a string to be matched at runtime. The client-supplied string is then matched by the computer, following the procedures disclosed above.

Example 1

Listing 2 is an input file for use by the program of Listing 1. It contains multiple possible strings to be matched against a client-supplied string. Listing 3 is automatically generated output using the program of Listing 1. Listing 3 consists of Java source code, which can be incorporated, in another computer application, which enables rapid matching of a client-supplied string against the particular set of strings listed in Listing 2.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method, comprising:
a computer system receiving a first input string;
determining the length of the first input string;
using the length of the first input string to select, from a plurality of data structures, a selected data structure, wherein each of the plurality of data structures stores a corresponding set of target strings, wherein each target string in a given one of the plurality of data structures has the same length, wherein the selected data structure has a selected set of target strings, each of which has a length equal to the length of the first input string;
the computer system attempting to match the first input string with one of the selected set of target strings stored in the selected data structure, including performing one or more successive comparison operations between 1) a character value at a current character position within the first input string, and 2) a set of one or more character values, each of which is located at the current character position within one of a current subset of the selected set of target strings;
wherein the current character position for each successive comparison has been selected to produce the greatest amount of partitioning among the current subset of target strings, wherein each successive comparison results in selecting a subset of the current subset of target strings for performing any remaining comparison operations; and
wherein the successive comparison operations are performed until the first input string is matched or it is determined that none of the selected set of target strings matches the first input string.

2. The method of claim 1, wherein the one or more successive comparison operations include an initial comparison operation, wherein the initial comparison operation is between 1) a first character position of the first input string and 2) a set of one or more character values, each of which is located at the first character position within the selected set of target strings, wherein the first character position does not specify an initial position with the first input string.

3. The method of claim 1, wherein selecting the subset of the current subset includes determining that a particular character value of the set of one or more character values is equal to the character value at the current character position in the first input string.

4. The method of claim 1, wherein a match is determined without performing a comparison using all character positions in the first input string.

5. A data processing system, comprising:
a computer storing program instructions executable by the computer to:
receive a first input string;
determine the length of the first input string;

use the length of the first input string to select, from a plurality of data structures, a selected data structure, wherein each of the plurality of data structures stores a corresponding set of target strings, wherein each target string in a given one of the plurality of data structures has the same length, wherein the selected data structure has a selected set of target strings, each of which has a length equal to the length of the first input string;

attempt to match the first input string with one of the selected set of target strings stored in the selected data structure, including performing one or more successive comparison operations between 1) a character value at a current character position within the first input string, and 2) a set of one or more character values, each of which is located at the current character position within one of a current subset of the selected set of target strings;

wherein the current character position for each successive comparison has been selected to produce the greatest amount of partitioning among the current subset of target strings, wherein each successive comparison results in selecting a subset of the current subset of target strings for performing any remaining comparison operations; and wherein the successive comparison operations are performed until the first input string is matched or it is determined that none of the selected set of target strings matches the first input string.

6. The data processing system of claim 5, wherein the one or more successive comparison operations include an initial comparison operation, wherein the initial comparison operation is between 1) a first character position of the first input string and 2) a set of one or more character values, each of which is located at the first character position within the selected set of target strings, wherein the first character position does not specify an initial position with the first input string.

7. The data processing system of claim 5, wherein selecting the subset of the current subset includes determining that a particular character value of the set of one or more character values is equal to the character value at the current character position in the first input string.

8. The data processing system of claim 5, wherein a match is determined without performing a comparison using all character positions in the first input string.

9. A computer readable memory medium storing program instructions executable by a computing system to:

receive a first input string;
determine the length of the first input string;
use the length of the first input string to select, from a plurality of data structures, a selected data structure, wherein each of the plurality of data structures stores a corresponding set of target strings, wherein each target string in a given one of the plurality of data structures has the same length, wherein the selected data structure has a selected set of target strings, each of which has a length equal to the length of the first input string;

attempt to match the first input string with one of the selected set of target strings stored in the selected data structure, including performing one or more successive comparison operations between 1) a character value at a current character position within the first input string, and 2) a set of one or more character values, each of which is located at the current character position within one of a current subset of the selected set of target strings;

wherein the current character position for each successive comparison has been selected to produce the greatest amount of partitioning among the current subset of target strings, wherein each successive comparison results in selecting a subset of the current subset of target strings for performing any remaining comparison operations; and wherein the successive comparison operations are performed until the first input string is matched or it is determined that none of the selected data structure's set of target strings matches the first input string.

10. The computer readable memory medium of claim 9, wherein the one or more successive comparison operations include an initial comparison operation, wherein the initial comparison operation is between 1) a first character position of the first input string t and 2) a set of one or more character values, each of which is located at the first character position within the selected set of target strings, wherein the first character position does not specify an initial position with the first input string.

11. The computer readable memory medium of claim 9, wherein selecting the subset of the current subset includes determining that a particular character value of the set of one or more character values is equal to the character value at the current character position in the first input string.

12. The computer readable memory medium of claim 9, wherein a match is determined without performing a comparison using all character positions in the first input string.

* * * * *

UNITED STATES PATENT AND TRADEMARK OFFICE
CERTIFICATE OF CORRECTION

| | | |
|---|---|---|
| PATENT NO. | : 7,747,635 B1 | Page 1 of 1 |
| APPLICATION NO. | : 11/019014 | |
| DATED | : June 29, 2010 | |
| INVENTOR(S) | : Shlomo Swidler and Daniel Blaukopf | |

It is certified that error appears in the above-identified patent and that said Letters Patent is hereby corrected as shown below:

Claim 9, col. 12, line 29, please change "selected data structure's set" to "selected set".

Signed and Sealed this

Fourteenth Day of December, 2010

David J. Kappos
*Director of the United States Patent and Trademark Office*